US009234768B2

(12) United States Patent
Pradhan et al.

(10) Patent No.: US 9,234,768 B2
(45) Date of Patent: Jan. 12, 2016

(54) SYSTEM AND METHOD FOR AUTOMATED SHUNT CALIBRATION OF A SENSOR

(71) Applicant: Honeywell International Inc., Morristown, NJ (US)

(72) Inventors: Mahendra Kumar Pradhan, Bangalore (IN); Gautham Ramamurthy, Bangalore (IN); Sudheer Beligere, Bangalore (IN); Vishal Malhan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 13/782,713

(22) Filed: Mar. 1, 2013

(65) Prior Publication Data

US 2014/0245808 A1     Sep. 4, 2014

(51) Int. Cl.
| | |
|---|---|
| *G01L 27/00* | (2006.01) |
| *G01P 21/00* | (2006.01) |
| *G01D 1/00* | (2006.01) |
| *G01D 3/024* | (2006.01) |
| *G01D 18/00* | (2006.01) |

(52) U.S. Cl.
CPC ............... *G01D 1/00* (2013.01); *G01L 27/002* (2013.01); *G01D 3/024* (2013.01); *G01D 18/00* (2013.01)

(58) Field of Classification Search
CPC ............................... G01L 27/00; F15B 19/002
See application file for complete search history.

(56) References Cited

U.S. PATENT DOCUMENTS 3,450,978 A * 6/1969 Norman ........................ 323/273
(Continued)

FOREIGN PATENT DOCUMENTS

DE     102008013275 A1 * 9/2009

OTHER PUBLICATIONS

Clegg, "Shunt Calibration for Dummies; a Reference Guide," 39 pages, Aug. 2, 2005.
(Continued)

*Primary Examiner* — Eric S McCall
*Assistant Examiner* — Anthony W Megna Fuentes
(74) *Attorney, Agent, or Firm* — Seager, Tufte & Wickhem LLP

(57) ABSTRACT

A sensor assembly may include a Wheatstone bridge with one or more sense elements, an amplifier coupled to the Wheatstone bridge for providing a sensor output signal, a resistor, and a switch for connecting the resistor between the sensor and an adjustable power source output to induce an offset in the sensor output signal. In some instances, a controller may perform an automatic shunt calibration procedure by activating the switch to connect the resistor between the sensor and the adjustable power source output to induce an offset in the sensor output signal. The controller may read the output value and compare the output value with a predetermined value. The controller may adjust the power source output to a value that moves the sensor output value toward the predetermined value. The controller may repeat the reading, comparing and adjusting step until the sensor output value is within a predetermined range of the predetermined value.

22 Claims, 5 Drawing Sheets

(56) References Cited

U.S. PATENT DOCUMENTS

| | | | |
|---|---|---|---|
| 4,414,837 A | | 11/1983 | Bice et al. |
| 4,627,296 A | | 12/1986 | Morgan et al. |
| 5,220,519 A | | 6/1993 | Eller et al. |
| 5,343,755 A | * | 9/1994 | Huss .......................... 73/708 |
| 7,073,389 B2 | | 7/2006 | Kurtz et al. |
| 7,719,416 B2 | | 5/2010 | Arms et al. |
| 2002/0073783 A1 | | 6/2002 | Wilner et al. |
| 2010/0153054 A1 | * | 6/2010 | Horiguchi ................ 702/120 |
| 2011/0169497 A1 | * | 7/2011 | Kurtz et al. ............... 324/526 |
| 2011/0228952 A1 | * | 9/2011 | Lin ............................ 381/105 |
| 2012/0218034 A1 | * | 8/2012 | Turullols et al. .......... 327/540 |

OTHER PUBLICATIONS

Honeywell, "Field Set-Up of Transducer and Instrument," p. 519-520, Downloaded Jan. 7, 2013. http://sensing.honeywell.com/TMsensor-help.

Honeywell, "SC Instrumentation," Document Number: 008-0671-00, 150 pages, Revised Mar. 2004.

Interface Force, "Instrument Shunt Calibration," 1 page, printed Jan. 7, 2013. www.loadcelltheory.com/instrumentShuntCal.html.

PCB Piezotronics Inc., "Shunt Calibration of a Strain Gage Sensor," 1 page, © 2002. FTQ-shuntcal-0202.

Vishay Precision Group, "Strain Gages and Instruments," 20 pages, Downloaded Jan. 7, 2013. TM-514.

\* cited by examiner

SYSTEM AND METHOD FOR AUTOMATED SHUNT CALIBRATION OF A SENSOR

TECHNICAL FIELD

The present disclosure relates generally to sensors, and more particularly, to a system and method for shunt calibration of sensors.

BACKGROUND

Pressure sensors often include a pressure sense element that is configured to detect a pressure of a media to be sensed by converting mechanical stress caused by the incoming pressure of the media into an electrical output signal. Pressure measurements are typically taken in the context of absolute, gauge or differential (or relative) pressure measurements. An absolute pressure sensor measures a pressure relative to a vacuum (or near vacuum). A gauge sensor measures a pressure relative to atmospheric pressure. A differential pressure sensor measures a pressure difference between two pressure inputs. Pressure sensors are used in a wide variety of applications including commercial, automotive, aerospace, industrial, and medical applications, among other similar and dissimilar industries.

A common method for field calibration of such pressure sensors includes the "shunt calibration" method. This method typically applies a known, accurate resistance across one leg of the pressure sensor transducer, which simulates an actual physical stimulus when one is not present. Upon application of this shunt resistance, the output of the pressure sensor transducer changes as it would if a known pressure were applied. The shunt calibration method has some shortcomings. For example, in order to achieve the most accurate results, the value of the shunt resistance should be tailored to and depend on the particularly characteristics of the pressure sensor at hand. In some cases, the value of the shunt resistance may be calculated from calibration data derived from the particular pressure sensor. However, the selection of a shunt resistance value during calibration of the pressure sensor tends to increase the complexity of calibration and assembly of the pressure sensor, since various values of shunt resistors must be stocked in the factory, and since only a limited number of resistance values can be stocked, an ideal shunt resistance value will often not be achieved. What would be desirable is an improved system and method for shunt calibration of a sensor.

SUMMARY

The following summary is provided to facilitate an understanding of some of the innovative features unique to the present disclosure and is not intended to be a full description. A full appreciation of the disclosure can be gained by taking the entire specification, claims, drawings, and abstract as a whole.

In one example, a pressure sensor may include a pressure sensitive circuit, such as a Wheatstone bridge having one or more pressure sense elements, and one or more other electrical circuits. The pressure sensor may include an amplifier coupled to the Wheatstone bridge for providing a sensor output signal. In some cases, a resistor and a switch may be provided to facilitate shunt calibration of the pressure sensor. In one example, the switch may be used for connecting the resistor between the Wheatstone bridge and a power source output to induce an offset in the sensor output signal. In some cases, the Wheatstone bridge, the amplifier, the resistor and the switch may be provided within a common sensor assembly package. In some cases, the pressure sensor assembly may include a programmable power source having a power source output connected via the switch to the resistor. A method for calibrating the pressure sensor may include activating the switch to connect the resistor between the sensor and the power source output to induce an offset in the sensor output signal. The sensor output signal may be read and compared with a predetermined value. In some cases, the power source output signal may be adjusted to a value that moves the sensor output value toward the predetermined value. The reading, comparing and adjusting steps may be repeated until the sensor output value is within a predetermined range of the predetermined value In another example, a pressure sensor assembly may include a sensor having a Wheatstone bridge with one or more sense elements and an amplifier coupled to the Wheatstone bridge for providing a sensor output signal. The pressure sensor assembly may further include a resistor, a programmable power source having a power source output, and a switch for selectively connecting the resistor between the sensor and the power source output of the programmable power source to induce an offset in the sensor output signal. In some cases, the pressure sensor assembly may include two or more of the sensor, the resistor, the programmable power source and the switch within a common package. In some cases, a system for calibrating a sensor may include a sensor having a Wheatstone bridge and a controller for calibrating and/or determining the health of the pressure sensor. The sensor may one or more elements of the pressure sensor assembly discussed above. In some cases, the controller may be configured for receiving the sensor output signal, wherein the controller compares the sensor output signal to a predetermined value, and adjusts the power source output based on the received output signal so that the sensor output signal approaches the predetermined output signal.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following description of various illustrative embodiments of the disclosure in connection with the accompanying drawings, in which.

Figure 1:
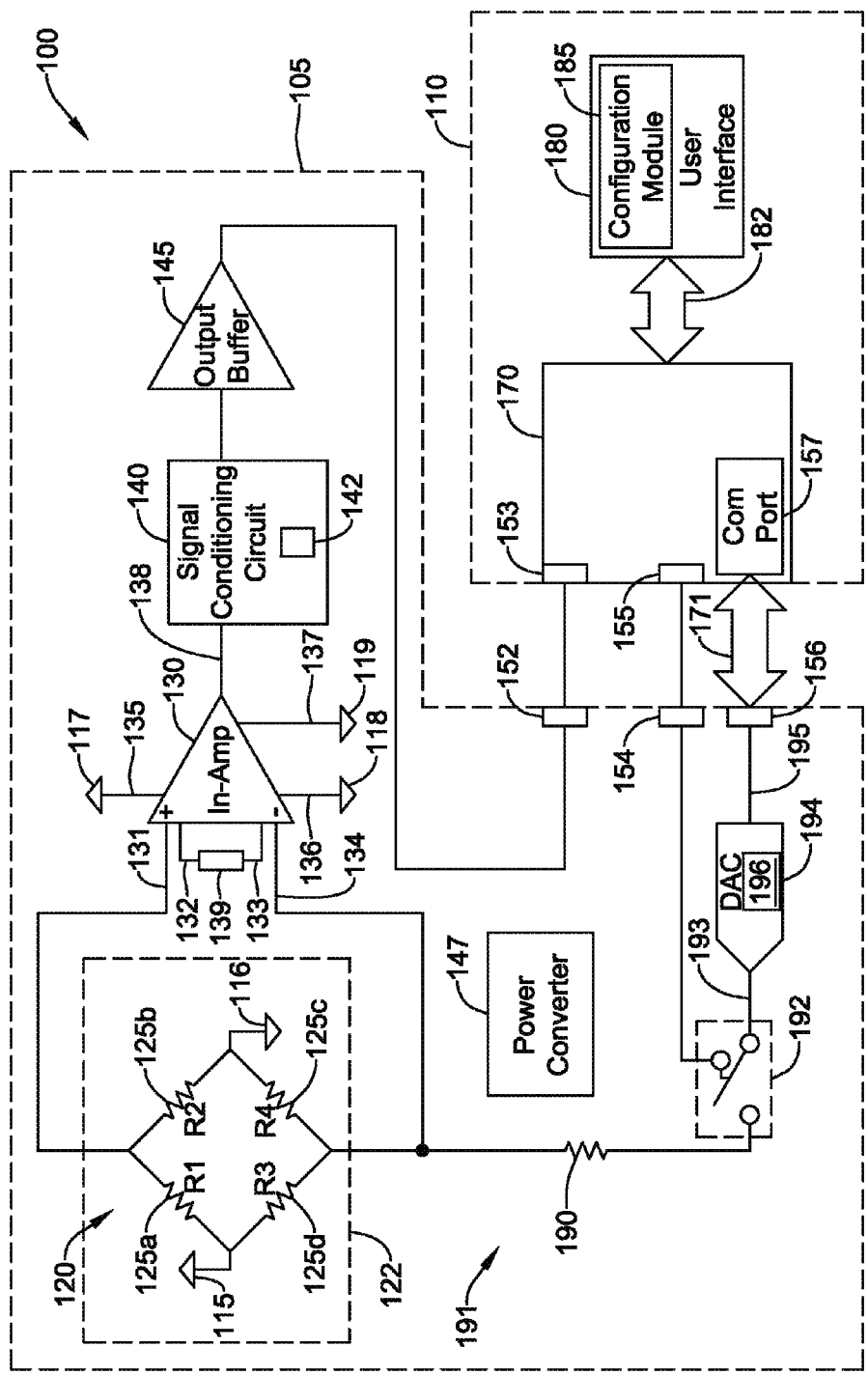
FIG. 1 shows an illustrative system for performing an automatic shunt calibration of a sensor.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

While the following examples are described with reference to pressure sensors, it is contemplated that this disclosure is not so limited, and may be applied to any other suitable sensors including, for example, load sensors, force sensors and other sensors, as desired.

Pressure sensors may include a pressure sense element, such as a Wheatstone bridge, to provide an output signal corresponding to a measure of a pressure applied to the sensor. In some cases, a user may perform shunt calibration to facilitate calibration and/or scaling of instrumentation, for determining the health of the sensor, and/or for other reasons. Shunt calibration may simulate a known pressure and/or strain applied to the pressure sense element so that the sensor output may be compared to one or more predetermined values. In some cases, for example, after a pressure sensor is installed for use in an application (e.g., an industrial application, a medical application, an energy application, a transportation application, etc.), the status and/or health (e.g., accuracy, linearity, etc.) of the pressure sensor may be monitored and/or checked from time-to-time using one or more shunt calibration methods to ensure that the sensor is operating as expected. An illustrative shunt calibration technique may include connecting a resistor to one of the arms of the Wheatstone bridge for introducing an offset that changes the output of the sensor to a predefined shunt output value that is based on, at least in part, the characteristics of the Wheatstone bridge and the value of the shunt resistor. In some cases, the shunt resistor may be provided internally to the sensor package, or externally to the sensor via two or more terminals.

In the case of an internal shunt resistor, the value of the shunt resistor may be selected based on one or more characteristics of the pressure sense element (e.g., the resistance of one or more of the Wheatstone bridge resistors), and may be a primary challenge when designing a shunt calibration circuit. For example, one or more characteristics of the Wheatstone bridge may vary between different pressure sensors, even sensors produced within the same production run. As a result, each sensor assembly may require different shunt resistor values. Typically, the shunt resistor values are selected based on the characteristics of the particular Wheatstone bridge circuit, and the desired output of the sensor during shunt calibration. Because the characteristics of the sensors that are to be included in sensor assemblies may vary within allowable limits, the value of the shunt resistors may need to be calculated individually for each sensor during a shunt calibration process. This can be time consuming and tedious. Also, a manufacturer of sensor assemblies may need stock a number of different resistors of different values and/or tolerances, which can increase the complexity and cost of the manufacturing and/or field support processes.

FIG. 1 shows an illustrative system 100 for performing an automatic shunt calibration procedure for a sensor assembly 105. In some cases, the illustrative system 100 may include a sensor assembly 105, and a controller 110 for performing and/or configuring the automatic shunt calibration procedure on the sensor assembly 105. In one example, the sensor assembly 105 may include one or more circuits and/or discrete components, such as a pressure sensing circuit (e.g., a Wheatstone bridge 120, with one or more pressure sensitive components 125a-125d), one or more amplifiers 130, a signal conditioning circuit 140, a buffer 145, a resistor (e.g., a shunt resistor 190), a switch 192 (e.g., a transistor, a relay, etc.), and/or a programmable and/or adjustable power source that may include a digital to analog converter (DAC) 194. The controller 110 may include one or more components that may be used to air in performing a shunt calibration procedure for the sensor assembly 105. For example, the controller 110 may include a microcontroller and/or digital acquisition card (DAQ) 170 and a user interface 180.

In some cases, the sensor assembly 105 may include the Wheatstone bridge 120 having one or more sense elements 125A-D (e.g., resistors) and may be positioned above a sense diaphragm 122. The Wheatstone bridge 120 may be configured in a full bridge configuration, a half bridge configuration, a quarter bridge configuration, or the like. In some cases, the Wheatstone bridge 120 may be configured to produce a differential signal output that may be provided to the differential input of the amplifier 130 (e.g., an instrumentation amplifier, an operational amplifier, etc.). The amplifier 130 may be configured to produce an amplified output signal corresponding to the differential output signal received from the Wheatstone bridge 120. In some cases, the amplifier 130 may include one or more amplifier inputs 131-137 and one or more amplifier outputs 138. In some cases, the inputs may include a non-inverting input 131, an inverting input 134, two or more inputs 132, 133 for connecting a gain resistor 139, one or more power supply inputs 135, 136, and a reference input 137. The reference input 137 may be used to adjust an offset to the output signal provided at the amplifier output 138. In some cases, the amplifier 130 may be configured to provide a differential output (not shown). In some cases, the amplifier 130 may be an adjustable gain amplifier, such as that shown and described in co-pending U.S. application Ser. No. 13/673,685, entitled, "VARIABLE SCALE SENSOR," filed on Nov. 9, 2012, which is incorporated herein by reference in its entirety and for all purposes.

In some cases, the output signal 138 from the amplifier 130 may be conditioned by a signal conditioning circuit 140. The signal conditioning circuit 140 may be configured to perform filtering, amplification, buffering, and/or other adjustments to the amplified pressure indicating signal. In some cases, the signal conditioning circuit 140 may include one or more discrete components (e.g., resistors, transistors, capacitors, inductors, diodes, etc.) and/or integrated circuits (e.g., operational amplifiers, buffers, ASICs, etc.), depending on the application. In some cases, the signal conditioning circuit 140 may include one or more filters 142. The filters 142 may be implemented as a combination of integrated or discrete elements, such as a resistor and a capacitor configured as a series RC network (e.g., a low-pass filter). Although a first order low-pass filter may be used, it is contemplated that any combination of analog or digital filters can be used, including one or more high pass filters, low pass filters, band pass filters, notch filters, passive filters (e.g., having "T" sections, "it" sections, etc.), active filters (e.g., Chebyshev filter, Butterworth filter, etc.), IIR filters, FIR filters, and/or any other suitable filter or filter combination, as desired. In some cases, a buffer 145 may be included within the signal conditioning circuit 140 or may be located adjacent to the signal condition circuit. The buffer 145, when provided, may be used to buffer the amplified pressure indicating signal before the signal is provided to a sensor output terminal 152 of the sensor assembly 105.

In some cases, the sensor assembly 105 may include one or more inputs and one or more outputs that may be configured to provide an electrical connection between an interior space within a sensor package and the exterior of the sensor package. For example, the sensor assembly 105 may include one or more inputs for providing power to the Wheatstone bridge 120, the amplifier 130, the signal conditioning circuit 140, the buffer 145, a digital analog converter (DAC) 194, and/or other circuits and/or components. In some cases, externally supplied electrical power received at an input terminal may be used by the different electrical circuits of the sensor assembly 105. The electrical energy may be used directly or converted to a different voltage level using one or more power converters and/or voltage dividers 147 to provide one or more reference voltages and/or electrical ground connections 115-119. The one or more reference voltages and/or electrical ground connections 115-119 may be one or more positive voltages (e.g., about 1.5 volts, about 3 volts, about 5 volts, etc.), one or more negative voltages (e.g., about −1.5 volts, about −3 volts, about −5 volts, etc.), a reference voltage of zero volts, or an electrical ground connection of an external electrical circuit. These are just some examples.

In some cases, the amplifier 130, the signal conditioning circuit 140 and/or the buffer 145 may be used to provide a pressure indicating signal as a voltage indication of pressure (e.g., from about 0 volts to about 5 volts, etc.), or a current indication of pressure (e.g., from about 4 milliamps to about 20 milliamps, etc.) at one or more outputs. For example, the sensor assembly 105 may include one or more inputs and/or outputs that may be used to provide and/or receive signals to and/or from the components located interior to the sensor assembly 105 to the circuits and/or devices (e.g., the controller 110, a process controller, a programmable logic controller (PLC), etc.) located external to the sensor 150. For example, the sensor assembly 105 may include a sensor output terminal 152 to output a pressure indicating signal, an input terminal 154 to receive a signal for activating the switch 192, a communication interface 156 for receiving and/or sending information to/from one or more devices external to the sensor assembly 105, such as the controller 110.

In some cases, one or more of the components of the sensor assembly 105 (e.g., the Wheatstone bridge 120, the amplifier 130, the signal conditioning circuit 140, the buffer 145, the resistors 139, 190, the switch 192, and/or the DAC 194) may be packaged in a common housing. In some cases, the packaged sensor may include a base and a cover to form a surface mount technology (SMT) package. In other cases, the base and/or the cover of the sensor housing may form another integrated circuit packaging type, such as a small-outline integrated circuit (SOIC) package, a plastic leaded chip carrier (PLCC) package, a Single In-Line Package (SIP), Dual In-Line Package (DIP), a Ball Grid Array (BGA) package, or any other suitable package type. The sensor package may be formed using any suitable material, or a combination of suitable materials including, for example, plastic, polyamide, ceramic, metal, or any other suitable material.

As mentioned above, the illustrative system 100 may include the controller 110 that may include the microcontroller and/or digital acquisition card (DAQ) 170. The controller 110 may, in some cases, include a user interface 180 that may be used to facilitate performance of a shunt calibration process of the sensor assembly 105. In some cases, the microcontroller and/or digital acquisition card (DAQ) 170 may include one or more inputs 153, one or more outputs 155, and/or a communication port 157 for interfacing with the sensor assembly 105. The user interface 180, when provided, may be integrated with the controller 110 (e.g., an industrial computer, a personal computer, a computer workstation, etc.) or may be provided separately from the controller 110 (e.g., a monitor, a tablet, a mobile device, or another human machine interface (HMI)). The user interface 180 may include one or more configuration modules 185 that may include a graphical and/or textual interface that allows a user to perform, for example, a shunt calibration technique for the sensor assembly 105. The microcontroller and/or digital acquisition card (DAC) 170 and the user interface 180 may be communicatively coupled via a wired and/or wireless communication link 182. In some cases, the communication link 182 may operate using one or more communication protocols for communicating over an internal communication bus (e.g., PCI, USB, ISA, etc.) or over an external communication bus (e.g., Ethernet , IEEE 802.11, USB, RS-232, RS-485, HDMI, DVI, ControlNet, Profibus, etc.).

In some cases, the microcontroller and/or digital acquisition card (DAQ) 170 may include one or more inputs and/or outputs that may be used when performing a shunt calibration process for the sensor assembly 105. For example, the microcontroller and/or digital acquisition card (DAQ) 170 may include at least one input 153 for receiving a pressure indicating signal from the sensor assembly 105. At least one output 155 may be used to control the operation of the switch 192 to selectively connect the shunt resistor 190 between the Wheatstone bridge 120 and the power source output 193 of the programmable power source and/or DAC 194 to induce an offset in the sensor output signal at sensor output terminal 152. In some cases, the controller 110 may be configured to perform a shunt calibration procedure on two or more sensor assemblies concurrently using the one or more inputs and the one or more outputs. The microcontroller and/or digital acquisition card (DAQ) 170 may include a communication interface port that may be communicatively coupled to the communication interface 156 of the sensor assembly 105 via a communication link 171.

As discussed above, a shunt calibration process may be used to simulate a pressure or strain applied to a sense element 125A-D (e.g., one or more of the strain sensitive resistors) of the Wheatstone bridge 120. In some cases, a user may use shunt calibration to calibrate and/or scale instrumentation for a particular application. As such, the user may desire the sensor output during shunt calibration to meet a specified value and/or be within a specified range of values. For example, the user may specify that the sensor output at sensor output terminal 152 should be a particular voltage (e.g., about −2.5 volts, about 0 volts, about 2.5 volts, about 5 volts, etc.), a particular current (e.g., about 4 milliamps, about 20 milliamps, about 10 milliamps, etc.), within a specified range of voltages or currents (e.g., between about 2.4 volts and 2.6 volts, between about 9 milliamps and 11 milliamps, etc.) during shunt calibration. In some cases, the user may specify the sensor output during shunt calibration as a percentage of a specified sensor output (e.g., the maximum sensor output). For example, a user may specify that during shunt calibration, the sensor output should be 25% of the maximum output value, or some other specified percentage (e.g., 50%, 75%, 100%, etc.).

In some cases, the shunt resistor 190 used for shunt calibration may be chosen based on one or more characteristics of the Wheatstone bridge 120, such that the output of the sensor assembly 105 during shunt calibration may substantially meet the specified output value. In other cases, the shunt resistor 190 may be selected such that the shunt resistor 190, in combination with the switch 192, and the programmable and/or adjustable power source (which may include a digital to analog converter (DAC) 194), may be used to produce the desired sensor output during shunt calibration. For example, the shunt resistor 190 may be selected to allow for a successful shunt calibration procedure for any allowable sensor variations for a particular sense die production run.

The switch 192 may be any electronic switch, including a solid state electronic switch such as a transistor (e.g., a metal-oxide-semiconductor field effect transistor (MOSFET), a junction FET (JFET), a bipolar junction transistor (BJT), etc.) and/or a relay (e.g., a solid state relay). In some cases, the switch 192 may be included within the sensor package. In other cases, the switch may be external to the sensor assembly 105, and may even be part of controller 110. The switch 192 may be used for selectively connecting the shunt resistor 190 between a portion of the Wheatstone bridge 120 and an output of the programmable and/or adjustable power source, such as the power source output 193 of the DAC 194 to induce an offset in the sensor output signal. In other cases, as shown in FIG. 2, the switch 192 may be used for selectively connecting the shunt resistor 190 between a reference input 137 of the amplifier 130 and an output of the programmable and/or adjustable power source, so as to superimpose an offset onto the amplified sensor output signal to provide the desired sensor output value during shunt calibration.

In some cases, the DAC 194 may be communicatively coupled via a communication interface 156 of the sensor assembly 105 to the communication port 157 of the controller 110 via a communication link 171. The communication link 171 may include one or more data lines capable of communicating via a communication protocol. For example, the communication protocol may be a serial communication protocol such as I²C, 1-Wire, serial peripheral interface (SPI), RS-232, RS-422, and/or RS-485. The communication link 171 may be configured for synchronous or asynchronous communication, full- or half-duplex, and may be a peer to peer communication link, a multi-master communication link, a master-slave communication link or the like.

The DAC 194 may include an input 195 for receiving one or more commands or signals for programming a power source value that may available at the power source output 193 that , in combination with the shunt resistor 190, may be used for shunt calibration of the sensor assembly 105. For example, the DAC 194 may be configured to adjust the voltage at the power source output 193 in response to a command received from the controller 110, which may then cause an associated adjustment in the sensor output signal. In some cases, the controller 110 may be configured to monitor the sensor output terminal 152 of the sensor assembly 105 and compare the sensor output value to at least one threshold value. In some cases, the controller 110 may transmit one or more commands to increase or decrease the power source value on the power source output 193 based on the comparison of the sensor output value to the at least one threshold value. In some cases, the programmable and/or adjustable power source may include a non-volatile memory 196 (e.g., EEPROM, ROM, etc.) for storing information about the shunt calibration procedure, such as a value provided by the one or more commands. For example, the controller 110 may cause the corresponding commanded power source output value to be stored to the non-volatile memory 196 of the DAC when the sensor output signal resulting from the commanded power source output value is within a predetermined range of the predetermined value.

Figure 2:
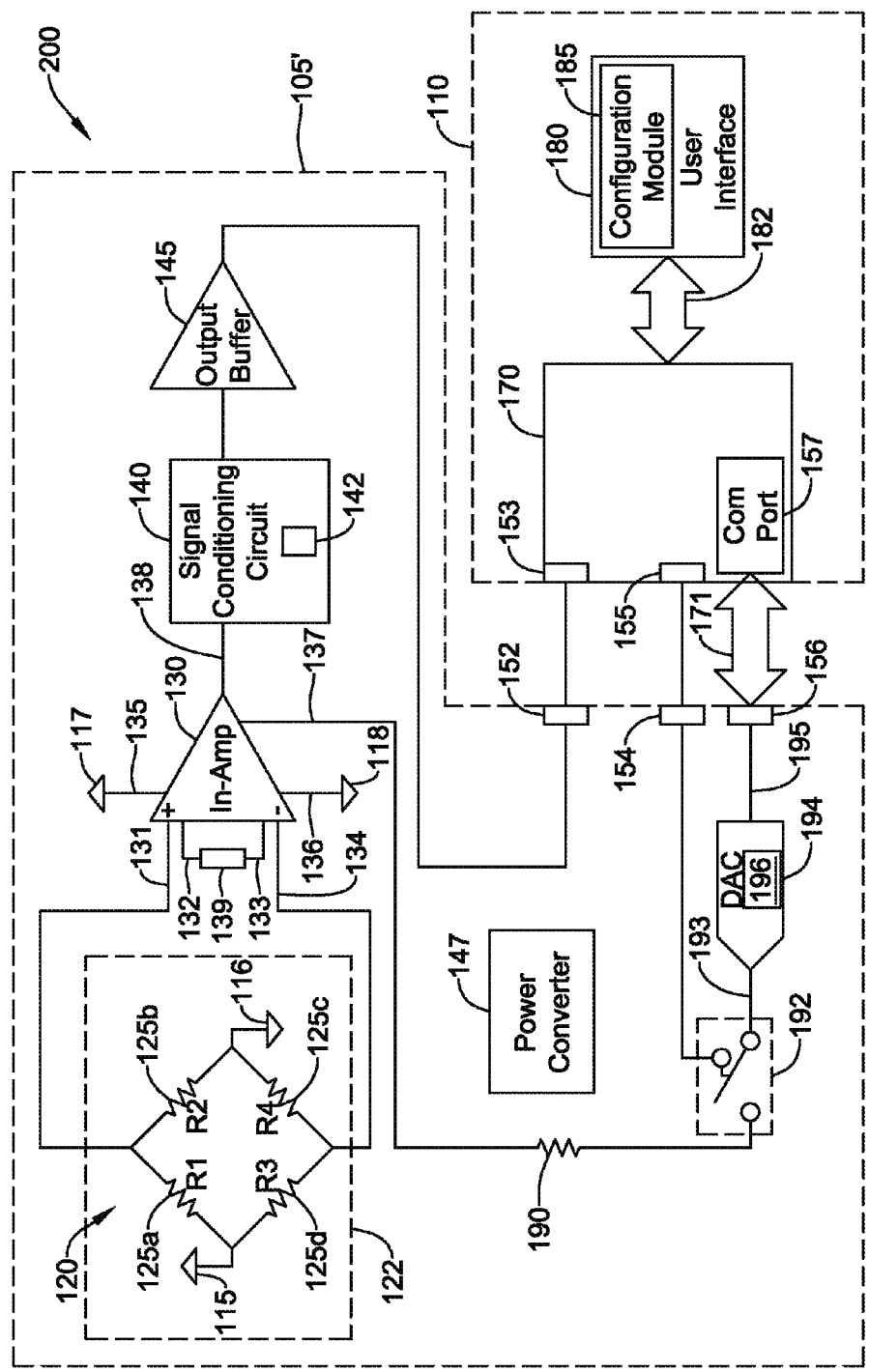
FIG. 2 shows another illustrative system for performing an automatic shunt calibration of a sensor.
Figure 3:
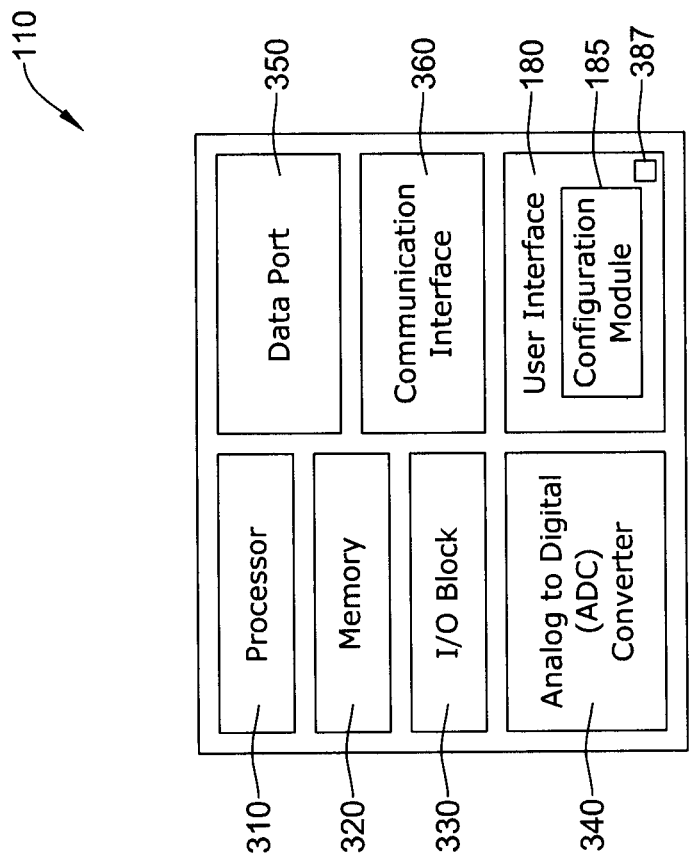
FIG. 3 shows an illustrative controller used for performing automatic shunt calibration of a sensor.

FIG. 3 is a schematic view of an illustrative controller, such as the controller 110 of FIGS. 1 and 2. In the example shown in FIG. 3, the controller 110 may include a processor (e.g. microprocessor, microcontroller, etc.) 310, a memory 320, an input/output (I/O) block 330, a data acquisition interface 340, a data port 350, a communication interface 360, and a user interface 180. In some cases, the processor 310 may operate using an algorithm that controls or at least partially controls a shunt calibration procedure and/or configuration of a user initiated shunt calibration procedure for one or more sensors, such as the sensor assembly 105 and 105' shown in FIGS. 1 and 2. In some cases, the processor 310 may access instructions and/or data stored in the memory 320 to perform the shunt calibration procedure and/or for configuring the sensor assembly 105 for a user initiated shunt calibration procedure.

The processor 310 may, for example, operate in accordance with an algorithm for automatically performing a shunt calibration technique for the sensor assembly 105. The algorithm may be used to activate the switch 192 via the output 155 to connect the shunt resistor 190 between the Wheatstone bridge 120 and the power source output of the DAC 194 to induce an offset in the sensor output signal (see FIG. 1). In another example, the algorithm may be used to activate the switch 192 via the output 155 to connect the shunt resistor 190 between the reference input 137 of the amplifier 130 and the power source output of the DAC 194 to induce an offset in the sensor output signal (see FIG. 2). The algorithm may cause the processor 310 to read the sensor output value received at the input 153 (see FIG. 1) and compare the received sensor output value to one or more predetermined value stored in the memory 320. The processor 310 may adjust the power source output to a value that moves the sensor output value toward the predetermined value, such as by sending one or more commands or signals to the DAC 194 via the communication port 157. The processor 310 may then repeat the reading, comparing and adjusting steps until the sensor output value is within a predetermined range of the predetermined value stored in the memory 320. When the processor 310 determines that the sensor output value is within the predetermined range of the predetermined value, the processor 310 may then cause the value of the power source output of the DAC 194 to be stored in the non-volatile memory 196 of the DAC 194 of the programmable and/or adjustable power source of the sensor assembly 105. As such, when a shunt calibration procedure is subsequently performed, such as in the field, the shunt calibration procedure may use the power source output value stored in the non-volatile memory 196.

In some instances, the processor 310 may be configured to operate the algorithm using an operating system (e.g., Windows, OS X, iOS, Android, Linux, Unix, GNU, etc.), or an example embedded operating system (e.g., QNX, NiagaraAX, Windows CE, etc.). In some cases, the controller 200 may include a timer (not shown). The timer may be integral to the processor 210 or may be provided as a separate component.

The memory 320 of the illustrative controller 110 may communicate with the processor 310. The memory 320 may be used to store any desired information, such as the aforementioned shunt calibration algorithm, one or more voltage levels, one or more thresholds, and/or the like. The memory 320 may be any suitable type of storage device, including a non-volatile memory such as a battery backed up RAM, ROM, EEPROM, flash memory, a hard drive, and/or the like. In some cases, processor 310 may store information within the memory 320, and may subsequently retrieve the stored information.

In some cases, the controller 110 may include an input/output block (I/O block) 330 for receiving one or more signals from at least one sensor, such as the sensor assembly 105. For example, the I/O block may include one or more inputs 153 and/or one or more outputs 155. The one or more inputs may be used to receive a sensor output value from the sensor assembly 105, such as the sensor output signal that is output during a shunt calibration procedure. In some cases, the controller 110 may include an analog to digital converter (ADC) 340 for converting an analog signal, such as the received sensor output signal, to a digital signal for use by the processor 310. The one or more outputs, such as the output 155 may be used for enabling and/or disabling the switch 192 to selectively connect the shunt resistor 190 between the Wheatstone bridge 120 (see FIG. 1) or the reference input 137 of the amplifier 130 (see FIG. 2). In some cases, the one or more inputs 153 and/or the one or more outputs 155 of the I/O block 330 may be used for performing shunt calibration for two or more sensors. For example, the controller 110 may be used to perform shunt calibration for two or more sensors during an assembly process of the two or more sensor assemblies.

In some cases, the communication interface 360 may include a communication port (e.g., the communication port 157) that may be used to communicate with the DAC 194 in the sensor assembly 105. The communication protocols may cause the controller 110 to communicate, for example, with the sensor assembly 105 via the communication link 171 to, for example, adjust a value available at the power source output 193 of the DAC 194 of the sensor assembly 105. In some cases, the controller 110 may cause the DAC 194 to store a value (e.g., a current output value, a commanded output value, etc.) in the non-volatile memory 196 that may be used as a predetermined output value of the DAC 194 during subsequent shunt calibration tests, such as in the field.

The communication interface 360 may include a chipset capable of communicating via one or more data lines of the communication link 171 using one or more communication protocols. Example communication protocols may include, but are not limited to, one or more serial communication protocols such as I²C, 1-Wire, serial peripheral interface (SPI), RS-232, RS-422, and/or RS-485. The communication interface 360 may be configured for synchronous or asynchronous communication, full- or half-duplex communication. In some cases, the communication interface 360 may support peer to peer communication, multi-master communication, master-slave communication, or the like. It is contemplated that the communication interface 360 may be wired or wireless, as desired.

In the illustrative embodiment of FIG. 3, the user interface 180 may be any suitable user interface that permits the controller 110 to display and/or solicit information, as well as accept one or more user interactions with the controller 110. For example, the user interface 180 may permit a user to enter data such as a desired shunt calibration level (e.g., a particular voltage level, a particular current level, a particular percentage of a total output, etc.), one or more thresholds, information about the resistor and/or other components of the sensor assembly 105, and the like. In some cases, user interface 180 may include a display and a distinct keypad. A display may be any suitable display. In some instances, the display may include or may be a liquid crystal display (LCD), and in some cases a fixed segment display or a dot matrix LCD display. If desired, user interface 180 may be a touch screen LCD panel that functions as both display and keypad. In some instances, a touch screen LCD panel may be adapted to solicit values for a number of operating parameters and/or to receive such values, but this is not required. In some cases, the user interface 180 may include a configuration module 185 that may be used to control one or more aspects of the shunt calibration process. In some cases, the configuration module 185 may be designed using a software package for creating a user interface, such as LabVIEW® from National Instruments Corporation of Austin, Tex. For example, a user may be able to select one or more characteristics of the sensor assembly 105 (e.g., an output type, a resistor size, etc.), a desired output level, and the like. In some cases, the user may initiate a shunt calibration procedure using the configuration module 185. In other cases, the configuration module 185 may be used to provide configuration information so that the controller 110 can automatically perform a shunt calibration technique for one or more sensors.

In many cases, the processor 310 may be configured to indicate information about the shunt calibration procedure to a user, such as by using the user interface 180. In some cases, the user interface 180 may provide a visual indication of the status of the shunt calibration procedure. For example, the processor may provide a visual indication of the sensor output signal as a voltage level, a current level and/or as a percentage of either the voltage level or the current level. In some cases, the processor 310 may output an indication of the energy (e.g. voltage and/or current) output by the DAC 194. In some cases, the processor 310 may be programmed to alert the user when the output of the sensor assembly 105 is within a predetermined range of a desired shunt calibration value. In some cases, the user interface 180 may provide some visual indication and/or audible indication. Such visual indication may include a colored, flashing, highlighted, or grayed-out button or icon provided on the user interface 180. In some cases, an audible indication may be used to alert a user that a fault has occurred using, for example, a speaker 387 associated with the user interface 180. In still other instances, the processor 310 may be configured to send a message to a user and/or another device indicating the status of the shunt calibration procedure. For example, the processor 310 may send a message indicating the success, the failure, and/or another intermediate status of the shunt calibration procedure via an internet gateway or other device (e.g. an internet gateway) that is adapted to communicate over the internet or other wide area network.

In some cases, as illustrated in FIG. 3, the controller 110 may include a data port 350. The data port 350 may be a wireless port such as a Bluetooth™, WiFi, Zigbee or any other wireless protocol. In other cases, data port 350 may be a wired port such as a serial port, an ARCNET port, a parallel port, a serial port, a CAT5 port, a USB (universal serial bus) port, and/or the like. In some cases, Data port 350 may use one or more communication protocols, such as Ethernet, BACNet, LONtalk, ControlNet, DeviceNet, Profibus, etc., that may be used via a wired network or a wireless network. In some instances, data port 350 may be a USB port and may be used to download and/or upload information from a USB flash drive or some other data source. Other remote devices may also be employed, as desired.

The data port 350 may be configured to communicate with the processor 210 and may, if desired, be used to upload information to the memory 320 and/or download information from the memory 320. Information that can be uploaded and/or downloaded may include, for example, values of operating parameters, one or more resistor values (e.g., the shunt resistor 190, the gain resistor 139, etc.). In some instances, data port 350 may be used to upload a previously-created shunt calibration configuration, including a value output by the DAC 194 and/or the value of the shunt resistor 190 into the controller 110, thereby hastening the shunt calibration process. In some cases, the data port 350 may be used to download one or more characteristics of the sensor assembly 105, and/or the sensor configuration for a successful shunt calibration procedure that has been created using the controller 110, so that the configuration(s) may be downloaded and transferred to other similar controllers, hastening their programming process.

In some cases, the data port 350 may be used to download data stored within the memory 320 for analysis. For example, the data port 350 may be used to download a history of shunt calibration values or parts thereof to a remote device such as a USB memory stick (also sometimes referred to as a thumb drive or jump drive), personal computer, laptop, iPAD® or other tablet computer, PDA, smart phone, or other device, as desired. In some cases, the data may be convertible to an MS EXCEL®, MS WORD®, text, XML, and/or Adobe PDF® file, but this is not required.

Figure 4:
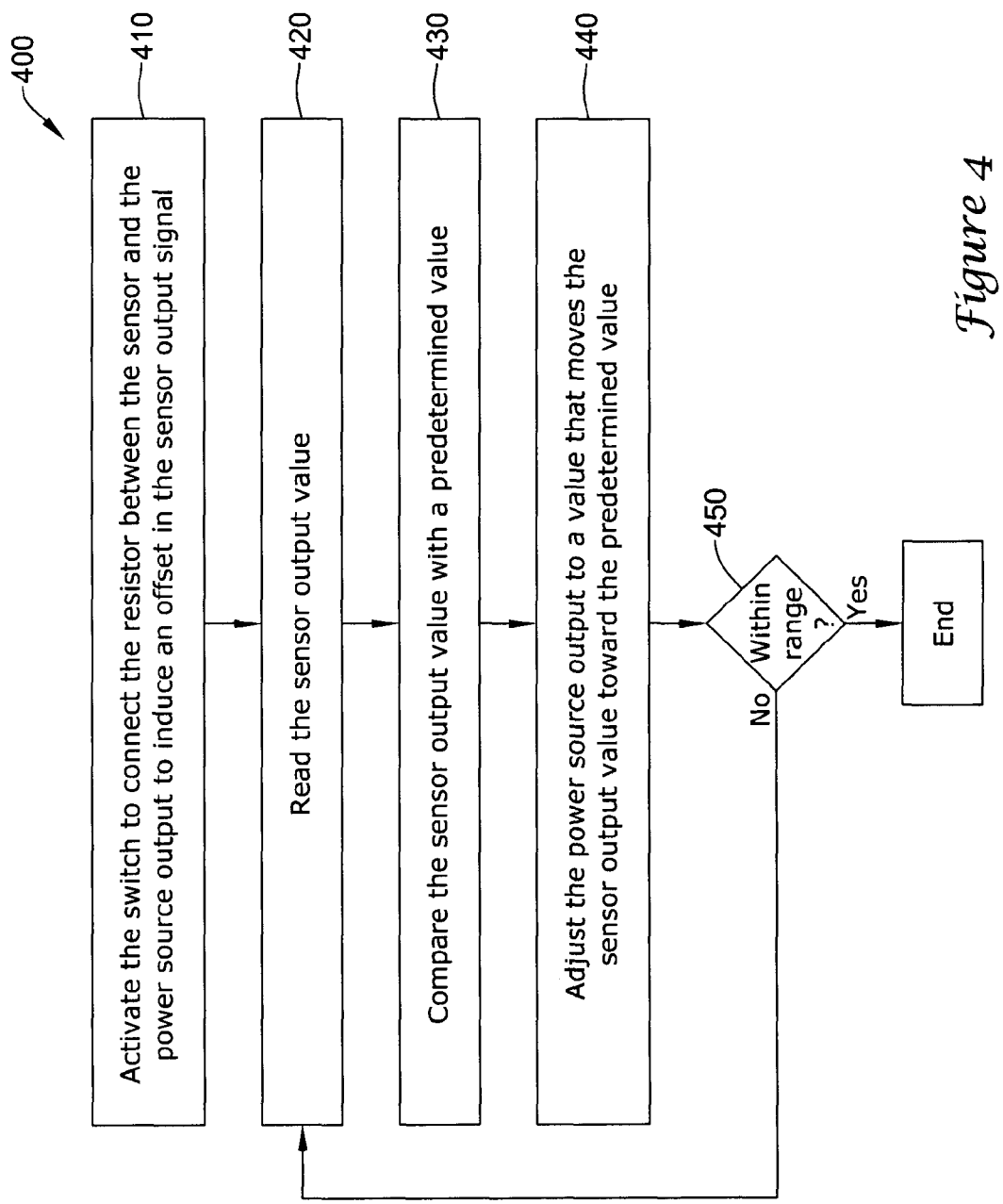
FIG. 4 shows an illustrative method for automatic shunt calibration of a sensor.

FIG. 4 shows an illustrative method 400 for automatic shunt calibration of a sensor, such as the sensor assembly 105 and 105' of FIGS. 1 and 2. In one instance, the illustrative method 400 may be used for calibrating the sensor assembly 105 having a Wheatstone bridge 120 with one or more sense elements 125A-D, an amplifier 130 coupled to the Wheatstone bridge 120 for providing a sensor output signal, a shunt resistor 190, and a switch 192 for selectively connecting the shunt resistor 190 between the sensor (e.g., the Wheatstone bridge 120, the reference input 137 of the amplifier 130, etc.) and a power source output 193 of an adjustable power source (the DAC 194) to induce an offset in the sensor output signal. At 410, the switch 192 may be activated to connect the shunt resistor 190 between the sensor and the power source output 193 to induce an offset in the sensor output signal that may be provided at a sensor output (e.g., the sensor output terminal 152). At 420, the sensor output value may be read by the controller 110 or another device. At 430, the controller 110 or other device may compare the received sensor output value with a predetermined value. In some cases, the predetermined value may be pre-selected by a manufacturer and/or may be selected by a user. The predetermined value may be entered via the user interface 180 of the controller 110 or other device, and/or may be stored in the memory 320. At 440, the controller 110 or other device may be configured to adjust the power source output, such as the power source output 193 of the DAC 194 moves the sensor output value toward the predetermined value. At 450, if the sensor output is not within the predetermined range, the controller 110 or other device may repeat the reading step 420, the comparing step 430 and the adjusting step 440. If, at 450, the sensor output is within the predetermined range, the shunt calibration method may be exited. In some cases, the controller 110 or other device may cause the power source output value to be stored in a memory, such as the non-volatile memory 196 of the DAC 194. The stored value may be used during subsequent shunt calibration procedures of the sensor assembly 105, such as in the field.

Figure 5:
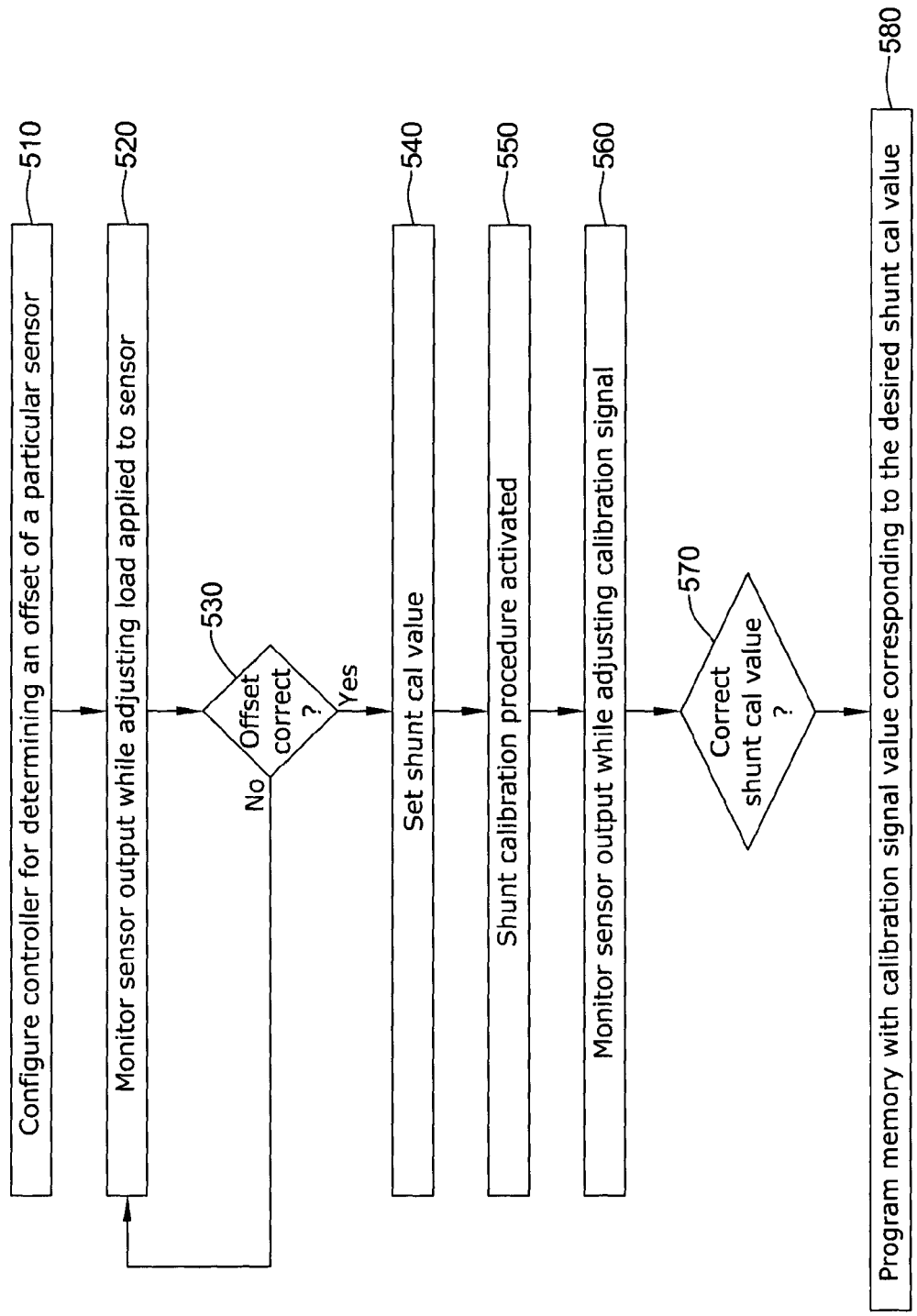
FIG. 5 shows another illustrative method for automatic shunt calibration of a sensor.

FIG. 5 shows another illustrative method 500 for automatic shunt calibration of a sensor, such as the sensor assembly 105 and 105' of FIGS. 1 and 2. The illustrative method 500 may be used, for example, to perform a shunt calibration method for one or more sensors. In one instance, the illustrative method 500 may be used to perform shunt calibration of a sensor assembly 105 during the manufacturing process of the sensor assembly 105.

A sensor assembly may include a sense die include the Wheatstone bridge 120 positioned above a sense diaphragm 122. The Wheatstone bridge may provide a pressure indicating signal to the amplifier 130 and be output via the sensor output terminal 152. The sensor output may be conditioned by using one or more components of the signal conditioning circuit 140 and/or the buffer 145. The sensor assembly 105 may include a shunt calibration circuit 191 including the shunt resistor 190, the switch 192 and an adjustable power source (DAC) 194. In some cases, the DAC 194 may include a non-volatile memory 196 for storing a measure associated with a value output by the DAC 194 when the sensor output signal at sensor output terminal 152 is within a desired range of a predetermined value.

In some instances, the illustrative method 500 may be used by a manufacturer and/or supplier of sensors. For example, a sensor supplier may allow a user to select a desired output value of a sensor to be output during shunt calibration. The illustrative method 500 may be used to allow the sensor output during shunt calibration to be adjusted to meet the user specification.

At 510, a controller may be configured to perform shunt calibration for a particular sensor. In the example shown, an operator may use the configuration module 185 of the user interface 180 to configure the controller 110 to perform shunt calibration of a particular sensor or family of sensors. In some cases, configuring the controller 110 may include determining an offset of a particular sensor when a specified load is applied (e.g. no load). At 520, the sensor output is monitored while the specified load (e.g. no load) is applied. In some cases, the sensor output may be compared to a threshold to determine an offset. At 530, if the offset is within a predetermined range of an expected value, control is passed to block 540. If the offset is not within a predetermined range of the expected value, control may be passed back to block 520 until the offset is within the predetermined range of the expected value.

Next, a desired shunt calibration value (e.g., a voltage value, a current value, a percentage) may be set in the controller 110. At 550, the shunt calibration process may be initiated. For example, a user may begin the shunt calibration procedure of one or more sensors using the user interface 180 of the controller 110. In some cases, the shunt calibration process may be automated, such as by using instructions stored in the memory 320.

At 560, the sensor output may be monitored to determine whether the sensor output value is within a predetermined range of the desired shunt calibration value, while the controller 110 adjusts a voltage output by the adjustable power source of the sensor assembly 105. At 570, the sensor output is compared to determine whether the sensor output corresponds to the desired shunt calibration value. If not, at 560, the sensor output is monitored as the output value of the adjustable power source is adjusted. If so, a measure associated with the output value of the adjustable power source is stored in memory to be used during subsequent shunt calibration processes. For example, the controller 110 may program the non-volatile memory 196 of the DAC 194 of the sensor assembly 105 with a measure associated with the output value of the DAC 194 that causes the sensor output to be near a desired shunt calibration value.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method for calibrating a sensor, the sensor having a Wheatstone bridge with one or more sense elements coupled to a reference voltage, an amplifier coupled to the Wheatstone bridge for providing a sensor output signal, a resistor and a series connected switch for connecting an adjustable power source output voltage to the sensor to induce an offset in the sensor output signal, the method comprising:
- activating the switch to connect the adjustable power source output voltage to the sensor via the switch and the resistor to induce an offset in the sensor output signal;
- reading a value of the sensor output signal;
- comparing the value of the sensor output signal with a predetermined value;
- adjusting the adjustable power source output voltage to a value that moves the value of the sensor output signal toward the predetermined value; and
- repeating the reading, comparing and adjusting steps until the value of the sensor output signal is within a predetermined range of the predetermined value.

2. The method of claim 1, further comprising:
storing a measure related to the value of the adjustable power source output voltage that corresponds when the value of the sensor output signal is within the predetermined range of the predetermined value.

3. The method of claim 1, wherein the switch is a field effect transistor (FET).

4. The method of claim 1, wherein the resistor is connected to the Wheatstone bridge.

5. The method of claim 1, wherein the resistor is connected to a reference input of the amplifier.

6. The method of claim 2, wherein the adjustable power source output voltage includes an output of a Digital to Analog Converter (DAC).

7. The method of claim 6, wherein the value of the adjustable power source output voltage is set via a digital signal to the DAC.

8. The method of claim 7, wherein the DAC is operatively connected to a non-volatile memory, and wherein the measure related to the value of the adjustable power source output voltage that corresponds when the value of the sensor output signal is within the predetermined range of the predetermined value is stored in the non-volatile memory.

9. A sensor assembly, comprising:
- a sensor coupled to a reference voltage, the sensor having:
  - a Wheatstone bridge with one or more sense elements;
  - an amplifier coupled to the Wheatstone bridge for providing a sensor output signal;
- a resistor;
- a programmable power source having an adjustable power source output voltage; and
- a switch connected in series with the resistor and the programmable power source, the switch is for selectively connecting the adjustable power source output voltage of the programmable power source to the sensor via the switch and the resistor to induce an offset in the sensor output signal.

10. The sensor assembly of claim 9, wherein the programmable power source includes a Digital-to-Analog Converter (DAC).

11. The sensor assembly of claim 10, wherein the programmable power source includes an input for receiving one or more commands for programming a power source value on the adjustable power source output voltage.

12. The sensor assembly of claim 11, wherein one or more first commands increase the power source value on the adjustable power source output voltage.

13. The sensor assembly of claim 11, wherein one or more second commands decrease the power source value on the adjustable power source output voltage.

14. The sensor assembly of claim 11, wherein the Digital-to-Analog Converter (DAC) includes a non-volatile memory for storing a value provided by the one or more commands.

15. A system for calibrating a sensor, comprising:
- a sensor coupled to a reference voltage and ground;
- circuitry including a Wheatstone bridge, and an amplifier coupled to the Wheatstone bridge for providing a sensor output signal;
- a resistor;
- a programmable power source having a power source output voltage;
- a switch for selectively electrically connecting the power source output voltage of the programmable power source to the sensor via the switch and the resistor to induce an offset in the sensor output signal; and
- a controller for receiving the sensor output signal, wherein the controller compares the sensor output signal to a predetermined value, and adjusts the power source output voltage of the programmable power source based on the received sensor output signal so that the sensor output signal becomes closer to the predetermined value.

16. The system of claim 15, wherein the resistor is connected to the Wheatstone bridge.

17. The system of claim 15, wherein the resistor is connected to a reference input of the amplifier.

18. The system of claim 15, wherein the sensor, the circuitry, the resistor, the programmable power source and the switch are included within a common sensor package.

19. The system of claim 15, wherein the controller further comprises an output, wherein the controller communicates one or more commanded power source output values to the programmable power source via the output using a communication protocol.

20. The system of claim 19, wherein the communication protocol is a serial protocol for communicating via a single wire.

21. The system of claim 15, wherein the power source output voltage comprises an output of a Digital to Analog Converter (DAC).

22. The system of claim 21, wherein the DAC comprises a non-volatile memory, wherein the controller stores a commanded power source output value to the non-volatile memory of the DAC when the sensor output signal resulting from the commanded power source output value is within a predetermined range of the predetermined value.

* * * * *